United States Patent
Stucker et al.

(10) Patent No.: US 8,284,906 B2
(45) Date of Patent: *Oct. 9, 2012

(54) MESSAGE MAPPING FOR FORCED HOLD CALL HANDLING IN A VOP ENVIRONMENT

(75) Inventors: Brian Stucker, Sachse, TX (US); Olga Wagner, Durham, NC (US)

(73) Assignee: Rockstar Bidco, LP, New York, NY (US)

( * ) Notice: Subject to any disclaimer, the term of this patent is extended or adjusted under 35 U.S.C. 154(b) by 1691 days.

This patent is subject to a terminal disclaimer.

(21) Appl. No.: 11/615,545

(22) Filed: Dec. 22, 2006

(65) Prior Publication Data

US 2008/0151870 A1    Jun. 26, 2008

(51) Int. Cl.
*H04M 11/04* (2006.01)

(52) U.S. Cl. ............... 379/45; 379/38; 379/46; 370/352; 455/404.1

(58) Field of Classification Search ............... 379/45, 379/38, 46; 370/352, 353, 354, 355; 455/404.1
See application file for complete search history.

(56) References Cited

U.S. PATENT DOCUMENTS 7,587,031 B1 * 9/2009 Ress et al. .............. 379/45
2006/0153342 A1  7/2006 Sasaki
2006/0251231 A1  11/2006 Arai

FOREIGN PATENT DOCUMENTS

WO    03/049467 A1    6/2003

OTHER PUBLICATIONS

European Search Report for European Patent Application No. 07024922.2, dated Nov. 18, 2009.

* cited by examiner

*Primary Examiner* — Gerald Gauthier
*Assistant Examiner* — Simon King
(74) *Attorney, Agent, or Firm* — Withrow & Terranova, PLLC (57) ABSTRACT

If a communication client disconnects from a call, an interworking service node may receive from the communication client a disconnect message indicative of an attempt to disconnect the call and send a forced hold message to place the call on forced hold in response to receiving the disconnect message. A portion of the call extending toward a public service access point and through the PSTN is placed on hold. When an operator wants to reestablish the call to the communication client, the interworking service node will receive over the PSTN a reconnect request message to reestablish the call with the communication client. The reconnect request message may be an integrated services user part message. In response to the reconnect message, the interworking service node will generate and send a session initiation message, which is configured to reestablish the call toward the communication client.

22 Claims, 8 Drawing Sheets

MESSAGE MAPPING FOR FORCED HOLD CALL HANDLING IN A VOP ENVIRONMENT

FIELD OF THE INVENTION

The present invention relates to telecommunications, and in particular to handling forced hold calls in a voice over packet (VoP) environment.

BACKGROUND OF THE INVENTION

Packet networks, such as the Internet, have evolved to a point where voice communications are capable of being supported with quality rivaling that of calls supported by the traditional public switched telephone network (PSTN). Since packet communications are inherently more efficient than the circuit-switched communications of the PSTN and allow voice calls to be associated with any number of other media sessions to provide advanced services, traditional telephony services are now supported over packet-based networks.

Two of the challenges with providing traditional telephony services over packet networks are meeting the expectations of the public and fulfilling legal requirements associated with telephony services. The public demands a telephone experience emulating that of the PSTN. In essence, the public needs a packet telephony interface to behave like a traditional telephony interface, which provides dial tones, dialed digit tones, ringing signals, busy signals, call waiting alerts, and the like. Service providers for packet telephony services are building terminals and configuring network devices to emulate traditional telephony services.

From a legal perspective, there are various requirements for telephony services. These requirements need to be fulfilled for packet telephony services. Of particular importance are the requirements for handling emergency services calls, such as those invoked when dialing 911 in the United States. In general, emergency services calls must be given priority and be immediately connected to an emergency services call center. Once an emergency services call is connected, a forced hold service may be invoked to assist in maintaining a connection with the caller's telephone terminal, even if the telephone terminal goes onhook or otherwise holds the call session. If the telephone terminal goes onhook, the connection is maintained to allow the caller to quickly reconnect to emergency services by simply taking the telephone terminal offhook. Alternatively, the emergency services operator can initiate a ringback function to cause the telephone terminal to ring, wherein the telephone terminal is reconnected to the maintained connection upon the telephone terminal going offhook. A full description of overall forced hold functionality is provided in ANSI T1.628A-2001: Network Hold, which is incorporated herein by reference.

Accordingly, there is a need for an efficient and reliable technique to provide a forced hold service in a packet network environment. Given the significant emergency services infrastructure already provided by the PSTN, there is a further need to take advantage of the PSTN's emergency services infrastructure when providing forced hold services in a packet network environment.

SUMMARY OF THE INVENTION

The present invention provides a technique for providing a forced hold service such as is used for an emergency services call, which is supported at least in part via a voice over packet network. The forced hold service acts to effectively hold a connection for the call with a called party, even when the caller takes an action that would normally end a call, such as going onhook, pressing end, or the like. When the caller takes an action that would normally end the call, the forced hold service allows the emergency services provider to effectively reestablish the call such that the caller is reconnected over the held connection upon going offhook, pressing send, or the like.

To initiate an emergency services call, a caller will dial an emergency services number. In response, the communication client will send a session initiation message to an interworking service node, which will assist in establishing a packet communication session for the emergency services call as well as a circuit-switched connection over the PSTN to an emergency services access point to support the emergency services call.

If the communication client disconnects from the call, the interworking service node will receive from the communication client a disconnect message indicative of an attempt to disconnect the call and send a forced hold message to place the call on forced hold in response to receiving the disconnect message. A portion of the call extending toward the public service access point and through the PSTN is placed on hold and a portion of the call extending toward the communication client through the voice over packet network is dropped.

When an operator wants to reestablish the call to the communication client, the interworking service node will receive over the PSTN a reconnect request message to reestablish the call with the communication client. The reconnect request message may be an Integrated Services User Part (ISUP) message, such as an ISUP facilities message. In response to the reconnect message, the interworking service node will generate a session initiation message and send the session initiation message, such as a Session Initiation Protocol (SIP) Invite message toward the communication client. The session initiation message is configured to reestablish the call with the communication client.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a technique for providing a forced hold service such as is used for an emergency services (ES) call, which is supported at least in part over a packet network. The forced hold service acts to effectively hold a connection for the ES call with an ES provider, even when the caller takes an action that would normally end a call, such as going on hook, pressing end, or the like. When the caller takes an action that would normally end the call, the forced hold service allow the ES provider to initiate a ringback function wherein the caller is reconnected over the held connection upon going offhook, pressing send, or the like. Prior to delving into the details of the present invention, an overview of an exemplary communication environment in which a forced hold service can be employed in a packet network is illustrated. For purposes of illustration only, the forced hold control is provided in an ES environment. Those skilled in the art will recognize that the invention is applicable to any forced hold scenario, such as those provided in malicious call hold scenarios.

Figure 1:
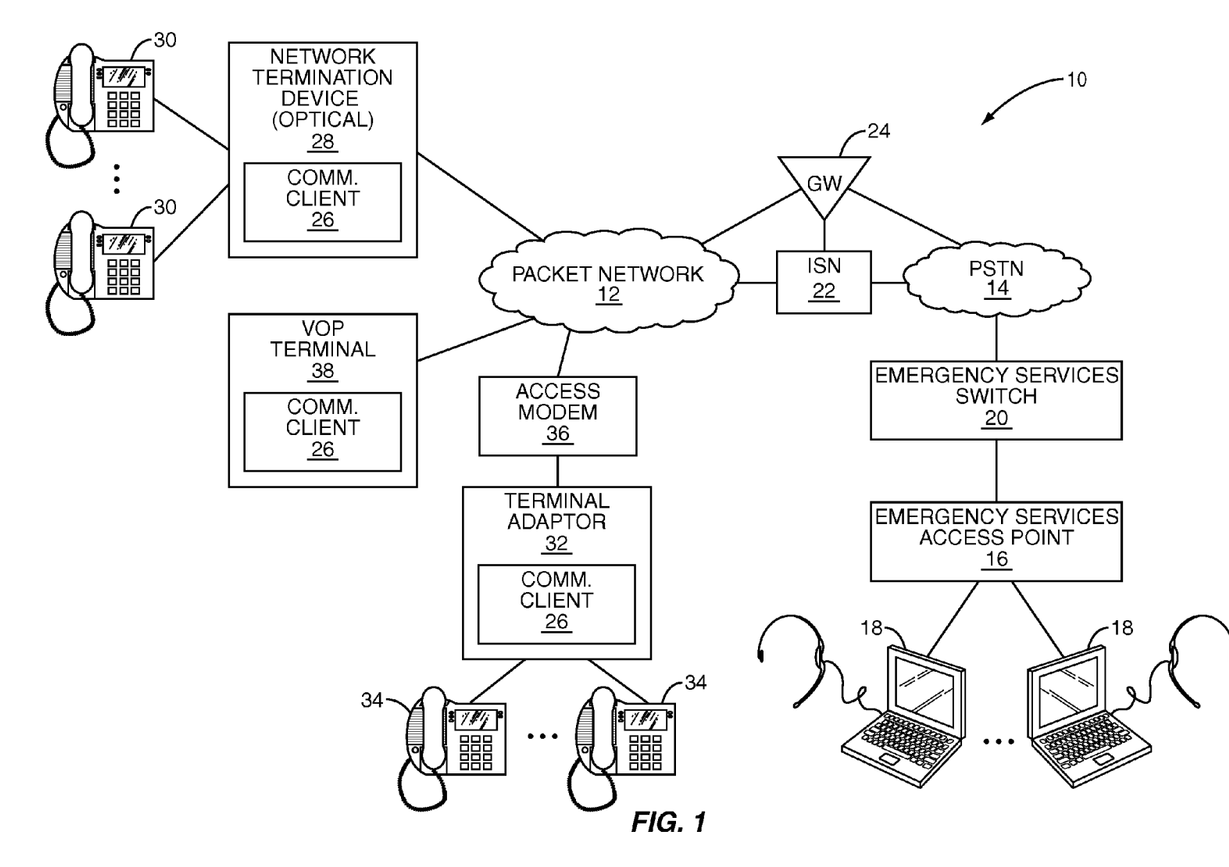
FIG. 1 is a block representation of a communication environment in which emergency services may be implemented according to one embodiment of the present invention.

With reference to FIG. 1, a communication environment 10 is illustrated and includes a packet network 12 and a public switched telephone network (PSTN) 14. Emergency services are provided in traditional fashion in association with the PSTN 14. In particular, an ES access point 16 provides automatic call processing and routing to any number of ES operator terminals 18, which are used by ES operators when responding to ES calls. An ES switch 20 is a dedicated circuit-switched telephony switch that connects to the PSTN 14 and is used to route ES calls to the ES access point 16 and support the circuit-switched connection between the ES operator terminals 18 and a communication terminal or other entity residing on the PSTN 14.

To support emergency services for calls initiated over the packet network 12, an interworking service node (ISN) 22 provided physically or logically between the packet network 12 and the PSTN 14. The ISN 22 resides in the call signaling path for calls and provides a signaling adaptation, or conversion, function to facilitate signaling over the packet network 12 and the PSTN 14 for the calls. The ISN 22 may also support the media path, or bearer path, for the calls in certain embodiments. If the media path is not supported by the ISN 22, the media path for calls established between the packet network 12 and the PSTN 14 may be established through a separate media gateway (GW) 24. The media gateway 24 and perhaps the ISN 22 may provide the requisite processing to facilitate packet communications over a packet communication session supported by the packet network 12 and circuit-switched communications over the PSTN 14. For any type of telephony call spanning the packet network 12 and the PSTN 14, the media gateway 24 may support a packet communication session over the packet network 12 and a circuit-switched connection over the PSTN 14. For an ES call, a circuit-switched connection may extend from the operator terminals 18 through the ES access point 16, the ES switch 20, and the PSTN 14 to the media gateway 24 or ISN 22.

A corresponding packet communication session will extend to the ES caller's communication terminal, which may take many forms as illustrated in FIG. 1. Notably, the signaling for establishing the packet communication session as well as a circuit-switched connection call spanning the packet network 12 and the PSTN 14 will be handled, at least in part, by the ISN 22. Regardless of form, a communication client 26 is generally provided in the communication terminal or in a device associated with the communication terminal to facilitate telephony calls and other multimedia communications. The illustrated communication terminals are merely exemplary and not intended to provide a comprehensive list of communication terminal embodiments.

A network termination device 28 may function to terminate an access network to the packet network 12, as well as emulate a traditional plain old telephone system (POTS) interface to traditional POTS telephones 30 at a residence or business location. For example, the network termination device 28 may terminate a fiber optic access network that connects to the packet network 12, and may appear as a POTS line from the PSTN to the POTS telephones 30. The communication client 26 will assist in establishing packet-based connections to support telephony calls, and perhaps assist in emulating the POTS line interface to the POTS telephones 30.

The communication client 26 may also be implemented in a terminal adaptor 32, which supports POTS-based telephones 34 and is configured to interact with an access modem 36, which provides a broadband interface through an appropriate access network to the packet network 12. Accordingly, the terminal adaptor 32 is relatively analogous to the network termination device 28, wherein the communication client 26 will support packet-based communication sessions to facilitate telephony or other multimedia applications as well as emulate a POTS interface for the POTS telephones 34.

The communication client 26 may also be implemented in the communication terminal itself. Accordingly, a Voice over Packet (VoP) terminal 38 may represent a packet-based telephone, personal computer, or personal digital assistant capable of providing packet-based communications, an in particular, packet-based telephony calls.

The ISN 22 is provided to facilitate the establishment and control of packet-based communication sessions involving a communication client 26. In certain embodiments, the ISN 22 may act as a proxy for the communication clients 26, an end office for the packet network 12 or PSTN 14, a gateway device, or the like. Although the present invention can be employed using various protocols, the following illustrations use the Session Initiation Protocol (SIP) and the associated Session Description Protocol (SDP) to facilitate and control packet-based communication sessions that are used in part for an ES call. SIP provides the signaling and control messages associated with the packet-based communication session, and SDP is primarily used to provide information allowing the respective communication endpoints to communicate with each other over a given media path. For example, SDP may be used to exchange address, port, and codec (coding/decoding) information for the packet-based communication sessions.

For reference, the communication client 26 may be considered a user agent, and the ISN 22 may be considered a back-to-back user agent or SIP proxy in a SIP environment. Those skilled in the art will recognize that user agents may be implemented in different types of communication devices to support communications on behalf of a standalone or integrated communication system.

For the media path of an ES call, a packet-based communication session may be established between the communication client 26 and the media gateway 24 under control of the ISN 22. A circuit-switched connection may be established between the media gateway 24 and the ES access point 16, which will act to connect the call to an appropriate ES operator terminal 18. Alternatively, the media path may extend through the ISN 22.

Figure 2:
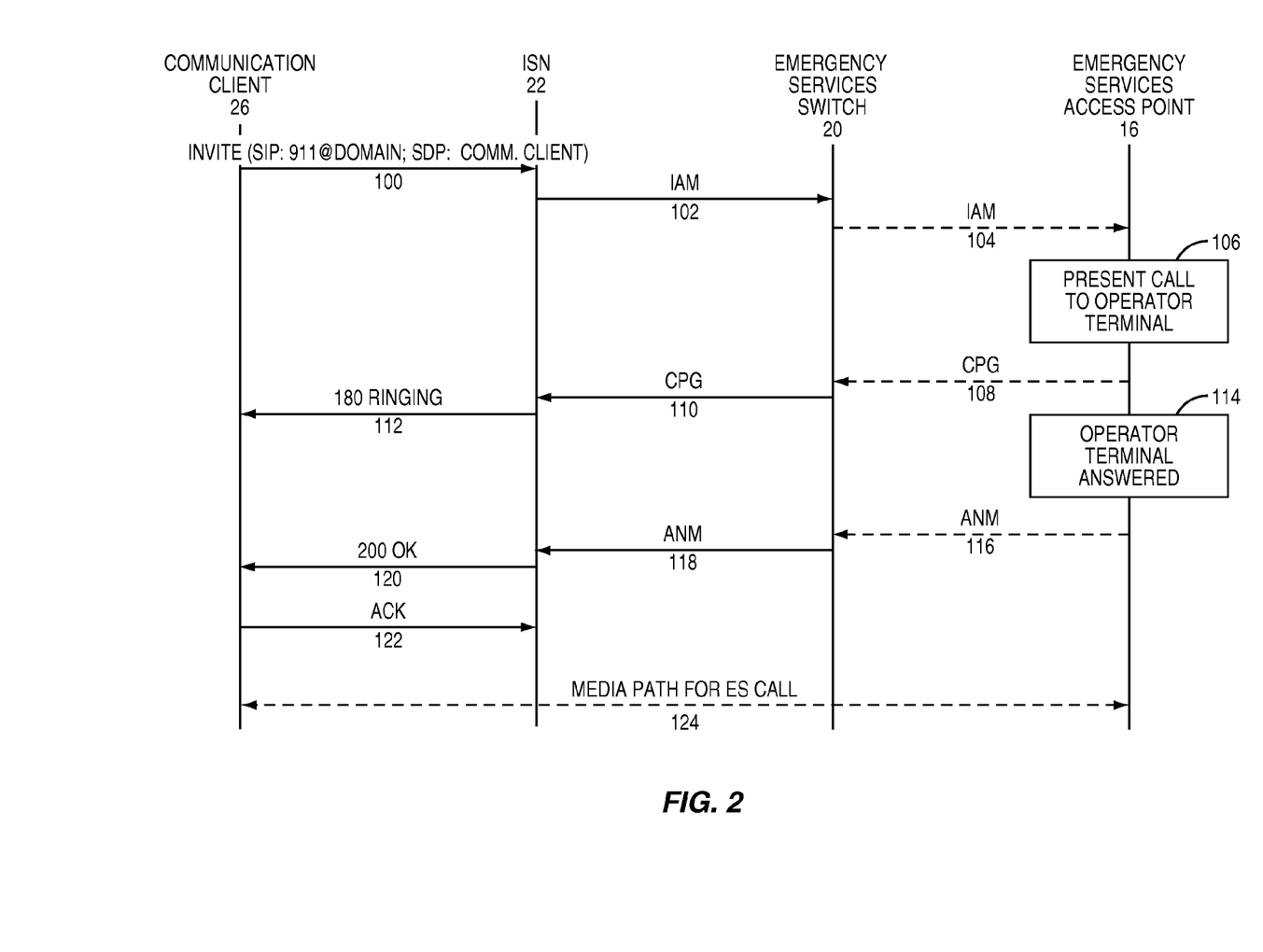
FIG. 2 is a communication flow diagram illustrating the establishment of an emergency services call.
Figure 3:
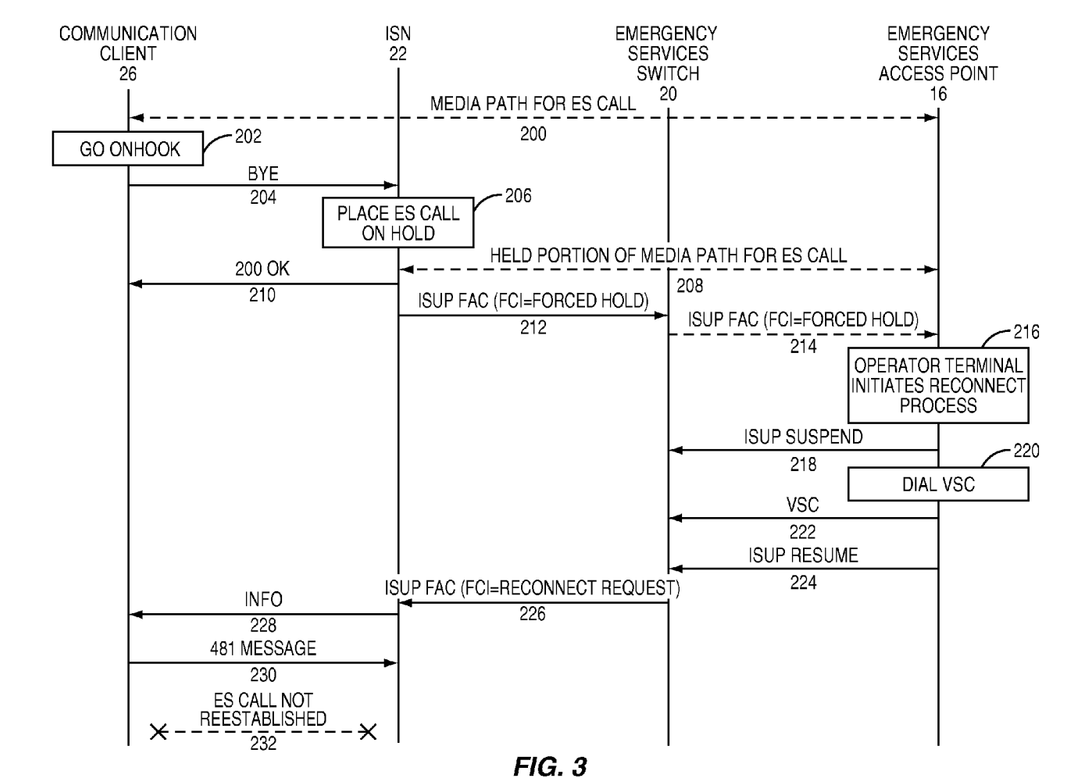
FIG. 3 is a communication flow diagram illustrating a failed reconnect process according to the prior art.
Figure 4:
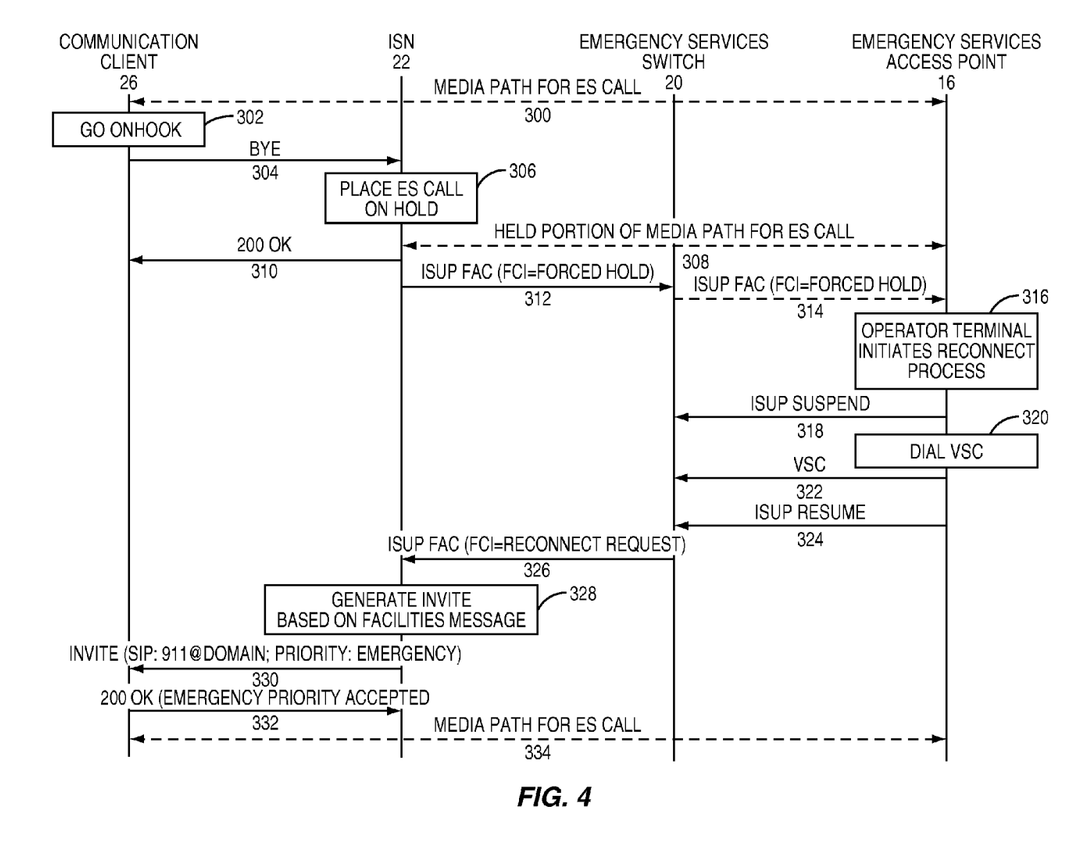
FIG. 4 is a communication flow diagram illustrating a reconnect process according to one embodiment of the present invention.

FIGS. 2-4 illustrate various communication flows relating to processing an ES call. In particular, FIG. 2 illustrates initiating and establishing an ES call within the communication environment illustrated in FIG. 1. FIG. 3 illustrates a problem that would arise if a reconnection process were attempted in an environment where current SIP and ISUP protocols are employed. FIG. 4 illustrates a reconnect process where an ES operator can reconnect to an ES call after the caller disconnects. For these communication flows, assume the communication client 26 is provided in a network termination device (NTD) 28, which supports a POTS telephone 30, the VoP Terminal 38, the terminal adaptor 32, or the like. The signaling steps are abbreviated for clarity and conciseness. Those skilled in the art will readily recognize any additional or supplemental signaling steps based on the teachings herein.

With particular reference to the communication flow of FIG. 2, establishment of an ES call is illustrated. The communication client 26 will recognize initiation of an ES call by a caller and send a Session Initiation message, such as a SIP Invite, to the ISN 22 to initiate the ES call (step 100). The Invite message will include an ES address (SIP:911@domain) and the SDP for the communication client 26. The ISN 22 will generate an ISUP Initial Address Message (IAM) and send the IAM to an ES switch 20 capable of handling the ES call (step 102). The ES switch will forward the IAM to a designated ES access point 16 (step 104), which will present the ES call to an ES operator at an ES operator terminal 18 (step 106). While the ES call is being presented to the ES operator terminal 18, an ISUP Call ProGress message (CPG) is sent from the ES access point 16 to the ES switch 20 (step 108). The CPG is forwarded to the ISN 22 (step 110), which will generate and send a 180 Ringing message to the communication client 26 (step 112).

When the ES operator answers the ES call at the ES operator terminal (step 114), an ISUP ANswer Message (ANM) is sent from the ES access point 16 to the ES switch 20 (step 116). The ANM is forwarded to the ISN 22 (step 118), which will generate and send a 200 OK message to the communication client 26 (step 120). The communication client 26 may respond by sending an ACKnowlegement message to the ISN 22 in response to the 200 OK message (step 122). At this point, a media path for the ES call is established between the ES operator terminal 18 and the communication client 26 (step 124).

The overall functionality of a forced hold process is documented in ANSI T1.628A-2001: Network Hold. Other bodies govern the SIP and ISUP signaling standards as well as the mapping of ISUP to SIP messages and vice versa. The relevant Request For Comments (RFCs) are:
RFC-2976: The SIP INFO Method;
RFC-3261: SIP: Session Initiation Protocol; and
RFC-3398: Integrated Services Digital Network (ISDN) User Part (ISUP) to Session Initiation Protocol (SIP) Mapping, each of which is incorporated herein by reference.
The standards related to the SIP and ISUP signaling, and in particular, the standard for mapping ISUP messages to SIP messages will not allow a forced hold feature in a communication environment, such as that illustrated in FIG. 1, according to the requirement set forth in ANSI T1.628A-2001. The problem arises when an ES call has been held using a forced hold process and the ES operator attempts to reconnect the ES call to the communication terminal 26 for the caller. Once the caller disconnects, the reconnection process is not able to reconnect the ES call to the caller given the current ISUP to SIP mapping structure. The failure arises primarily from the need to map ISUP Facilities (FAC) messages to SIP Information (INFO) messages. An example of this failure is provided in communication flow of FIG. 3.

Assume a media path for an ES call is established as described in FIG. 2 (step 200). When the caller intentionally or accidentally disconnects the ES call, such as going onhook or pressing end (step 202), the communication client 26 is configured to send a BYE message to the ISN 22 according to the SIP requirements set forth in RFC 3261 (step 204). The ISN 22 will recognize that the ES call is an ES call and place the ES call on hold (step 206). As such, the media path for the ES call is effectively maintained to the ES operator terminal 18 from the either the ISN 22 or the gateway 24 (step 208).

The SIP requirements do not allow rejection of a BYE message. As such, the ISN 22 is effectively forced to send a 200 OK to the communication client 26 in response to the BYE message (step 210). As such, the packet-based connection to the communication terminal 26 is permanently dropped; thereby rendering a reconnection process futile, as is apparent from the following.

Recognizing that an ES call is on hold, the ISN 22 will send an ISUP FACilities (FAC) message indicating that a forced hold has been applied to the ES call to the ES switch 20 (step 212). The FAC message may include a feature code indicator (FCI) set to a value corresponding to a forced hold for an ES call. The ES switch 20 will send the FAC message to the ES access point 16, which is handling the ES call, to indicate that the ES call is being held (step 214). The ES access point 16 may send an alert to the ES operator via the ES operator terminal 18 to indicate that the ES call is on hold (not shown). The held media path for the ES call may still be active from the ISN 22 or media gateway 24 to the operator terminal 18.

When the ES operator decides to initiate a reconnect process to reestablish the ES call with the caller, the operator terminal 18 will provide reconnect instructions to the ES access point 16 (step 216). The ES access point 16 may then send and ISUP Suspend signal or message to the ES switch (step 218). The ISUP Suspend message may be a flash signal or dedicated message sufficient to allow the ES access point 16 to dial or otherwise provide a Vertical Services Code (VSC) to the ES switch 20 (steps 220 and 222). The VSC instructs the ES switch 20 to reconnect the ES call to the caller. If a flash signal is provided, dual tone multi-frequency (DTMF) digits may be provided to the ES switch 20 outside of the held media path for the ES call.

After providing the VSC, the ES access point 16 may send an ISUP Resume message to the ES switch 20 to reestablish the ES call with the caller (step 224). To alert the ISN 22 of the need to reestablish the ES call with the caller, the ES switch 20 will send an ISUP FAC message to instruct the ISN 22 to reconnect the held media path for the ES call to the communication client 26 of the caller (step 226). The ISUP FAC message may include an FCI set to a value identifying the need to reestablish the ES call with the caller.

Unfortunately, RFC 3398 mandates the mapping of ISUP FAC messages to SIP Information (INFO) messages, which have a payload corresponding to the type of message and the FCI value. Since the portion of the media that extended to the communication client 26 was dropped as a result of the BYE message (step 204), SIP INFO messages are rejected using a SIP 481 message. Continuing with the communication flow of FIG. 3, the ISN 22 will send an INFO message to the to the communication terminal 26 in response to receiving the ISUP FAC message from the ES switch 20 (step 228). The communication terminal 26 will reject the INFO message and send a 481 message back to the ISN 22 (step 230). As a result, the ES call is not reestablished with the caller (step 232).

The present invention solves problems described above, by mapping certain ISUP FAC messages to a Session Initiation (or re-initiation message), such as an Invite. The communication flow of FIG. 4 illustrates the present invention according to one embodiment. Assume a media path for an ES call is established as described in FIG. 2 (step 300). When the caller intentionally or accidentally disconnects the ES call, such as going on-hook or pressing end (step 302), the communication client 26 is configured to send a BYE message to the ISN 22 according to the SIP requirements set forth in RFC 3261 (step 304). The ISN 22 will recognize that the ES call is an ES call and place the ES call on hold (step 306). As such, the media path for the ES call is effectively maintained to the ES operator terminal 18 from the either the ISN 22 or the media gateway 24 (step 308).

Again, the SIP requirements do not allow rejection of a BYE message, and the ISN 22 is effectively forced to send a 200 OK to the communication client 26 in response to the BYE message (step 310). As such, the packet-based connection to the communication terminal 26 is dropped, but not permanently when the present invention is employed.

Recognizing that an ES call is on hold, the ISN 22 will send an ISUP FAC message indicating that a forced hold has been applied to the ES call to the ES switch 20 (step 312). The FAC message may include an FCI set to a value corresponding to a forced hold for an ES call. The ES switch 20 will send the FAC message to the ES access point 16, which is handling the ES call to indicate that the ES call is being held (step 314). The ES access point 16 may send an alert to the ES operator via the ES operator terminal 18 to indicate that the ES call is on hold (not shown). The held media path for the ES call may still be active from the ISN 22 or media gateway 24 to the operator terminal 18.

When the ES operator decides to initiate a reconnect process to reestablish the ES call with the caller, the operator terminal 18 will provide reconnect instructions to the ES access point 16 (step 316). The ES access point 16 may then send and ISUP Suspend signal or message to the ES switch (step 318). The ISUP Suspend message may be a flash signal or dedicated message sufficient to allow the ES access point 16 to dial or otherwise provide a VSC to the ES switch 20 (steps 320 and 322). The VSC instructs the ES switch 20 to reconnect the ES call to the caller. If a flash signal is provided, DTMF digits may be provided to the ES switch 20 outside of the held media path for the ES call.

After providing the VSC, the ES access point 16 may send an ISUP Resume message to the ES switch 20 to reestablish the ES call with the caller (step 324). To alert the ISN 22 of the need to reestablish the ES call with the caller, the ES switch 20 will send an ISUP FAC message to instruct the ISN 22 to reconnect the held media path for the ES call to the communication terminal 20 of the caller (step 326). The ISUP FAC message may include an FCI set to a value identifying the need to reestablish the ES call with the caller.

With the present invention, the ISUP FAC is mapped to an Invite message corresponding to the held ES call. As such, the ISN 22 will generate an Invite based on the ISUP FAC message received from the ES switch 20 (step 328) and send the Invite to the communication client 26 (step 330). The Invite may include indicia identifying it as an Invite or re-Invite intended to reestablish the ES call as well as provide relative priority for the message itself or the ES call in general. The communication client 26 will process the Invite along with the address and priority information contained therein and respond to the ISN 22 with a 200 OK message (step 332) The 200 OK may indicate that the relative priority asserted in the Invite was accepted by the communication client 26. The heightened priority level may dictate that the ES call take priority over all other calls and may result in current calls being dropped or subsequent calls being blocked or rejected until the emergency condition is removed.

In certain embodiments, the SDP for the ISN 22 or media gateway 24 supporting the call need not be redelivered to the communication client 26 in the Invite, as this information may have been previously provided, perhaps in the 200 OK message of step 310. At this point, a media path for the ES call is reestablished between the ES operator terminal 18 and the communication client 26 (step 334). In particular, the held media path for the ES call is connected to the communication terminal 26 over a packet connection from either the ISN 22 or media gateway 24.

Figure 5:
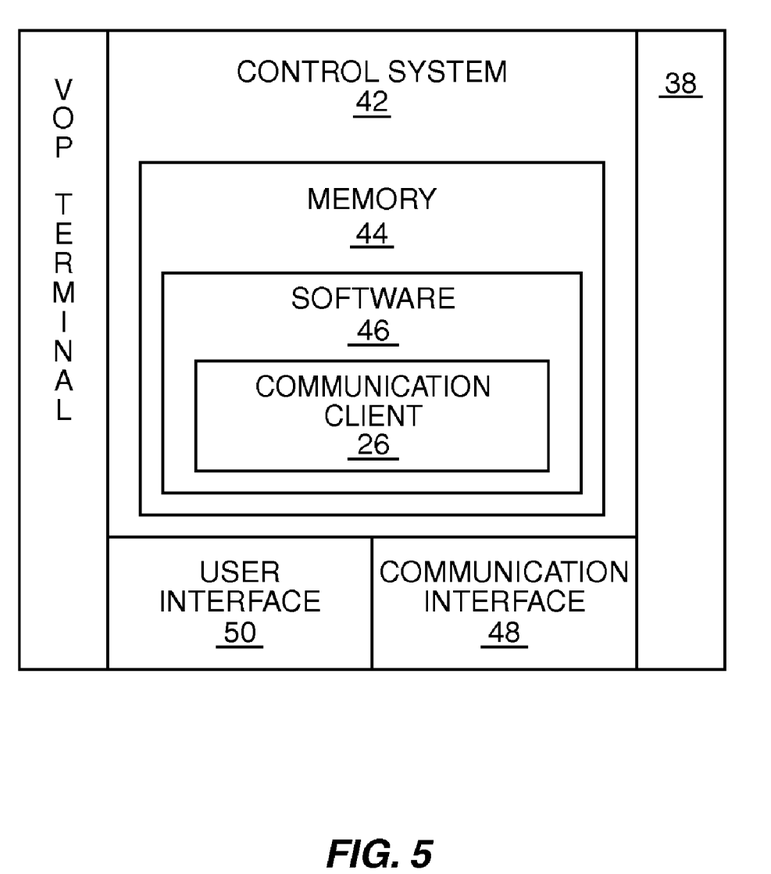
FIG. 5 is a block representation of a VoP terminal according to one embodiment of the present invention.

With reference to FIG. 5, a VoP terminal 38 is illustrated. The VoP terminal 38 may include a control system 42, which is associated with memory 44 having sufficient software 46 to provide the functionality described above. In particular, the software 46 may include the communication client 26 as well as one or more associated applications. The control system 42 is also associated with an appropriate communication interface 48 to facilitate packet communication sessions and any requisite signaling over the packet network 12. Further, the VoP terminal 38 may include a user interface 50 through which user input is received and information may be displayed to the user. The communication interface 48 and the user interface 50 will vary depending on the nature of the VoP terminal 38.

Figure 6:
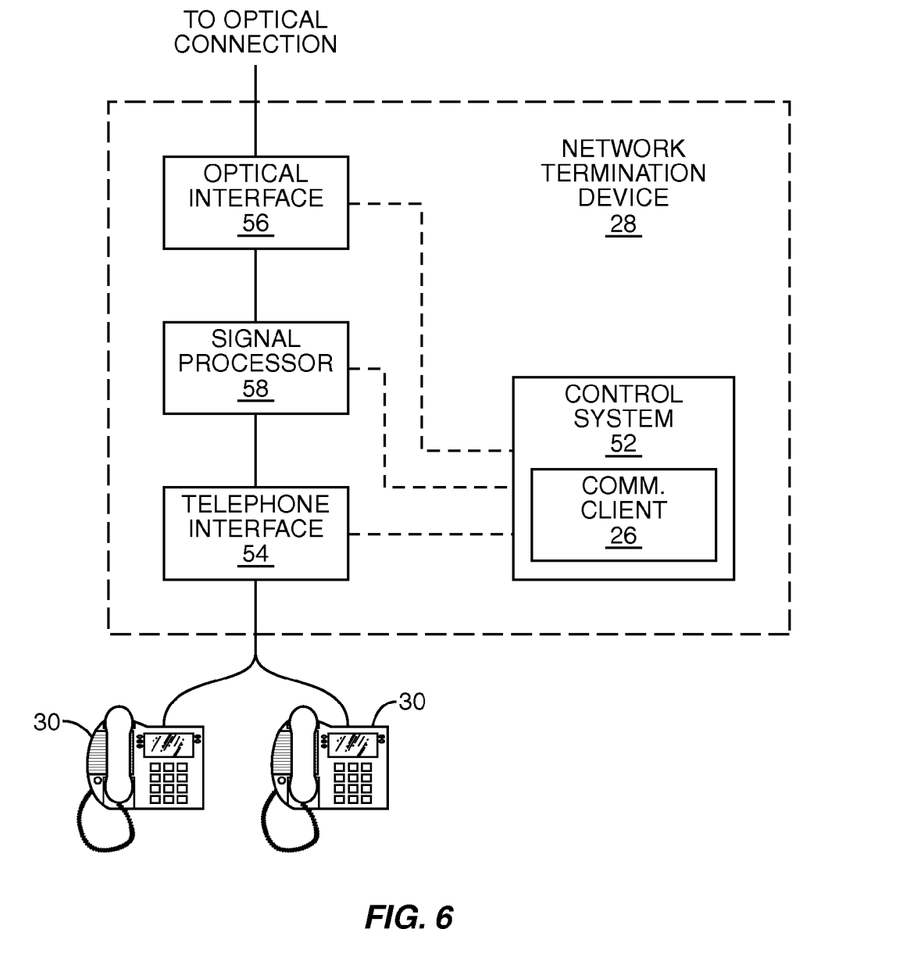
FIG. 6 is a block representation of a network terminal device according to one embodiment of the present invention.

A block representation of a network termination device 28 is provided in FIG. 6. Preferably, the network termination device 28 will include a control system 52 operatively associated with a telephone interface 54 emulating an analog POTS line supporting the POTS telephones 30, an optical (or copper) interface 56 for terminating an optical (or copper) access network line leading directly or indirectly to the packet network 12, and a signal processor 58. The signal processor 58 is effectively part of the control system 52, and is capable of providing all the necessary coding, decoding, and conversions necessary for the optical interface 56 to operate with the telephone interface 54. The control system 52 also provides the communication client 26, which functions as described above.

Figure 7:
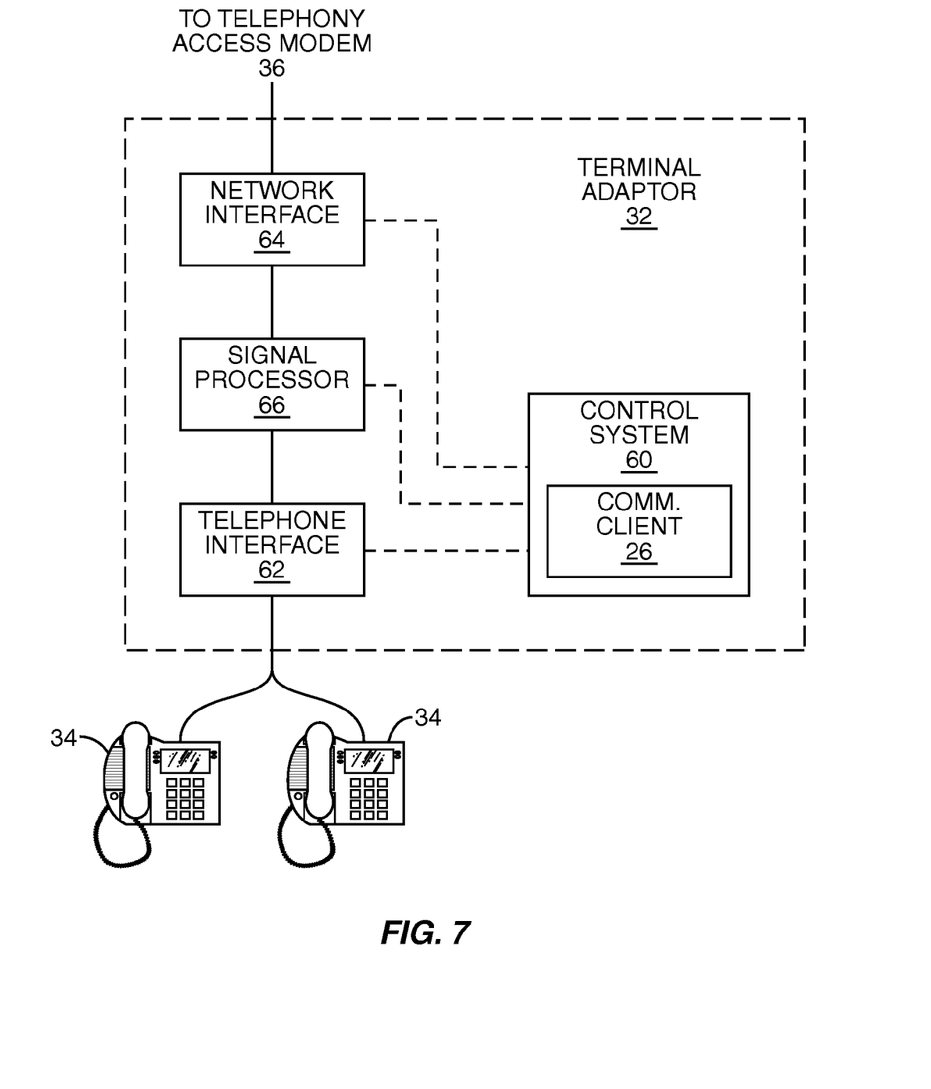
FIG. 7 is a block representation of a terminal adaptor according to one embodiment of the present invention.

A block representation of a terminal adaptor 32 is provided in FIG. 7. The terminal adaptor 32 will include a control system 60 operatively associated with a telephone interface 62 emulating an analog POTS line supporting the POTS telephones 34, a network interface 64 leading directly or indirectly via the access modem 36 to an access network, which is connected to the packet network 12, and a signal processor 66. The signal processor 66 is effectively part of the control system 60, and is capable of providing all the necessary coding, decoding, and conversions necessary for the network interface 64 to operate with the telephone interface 62. The control system 60 also provides the communication client 26, which functions as described above.

Figure 8:
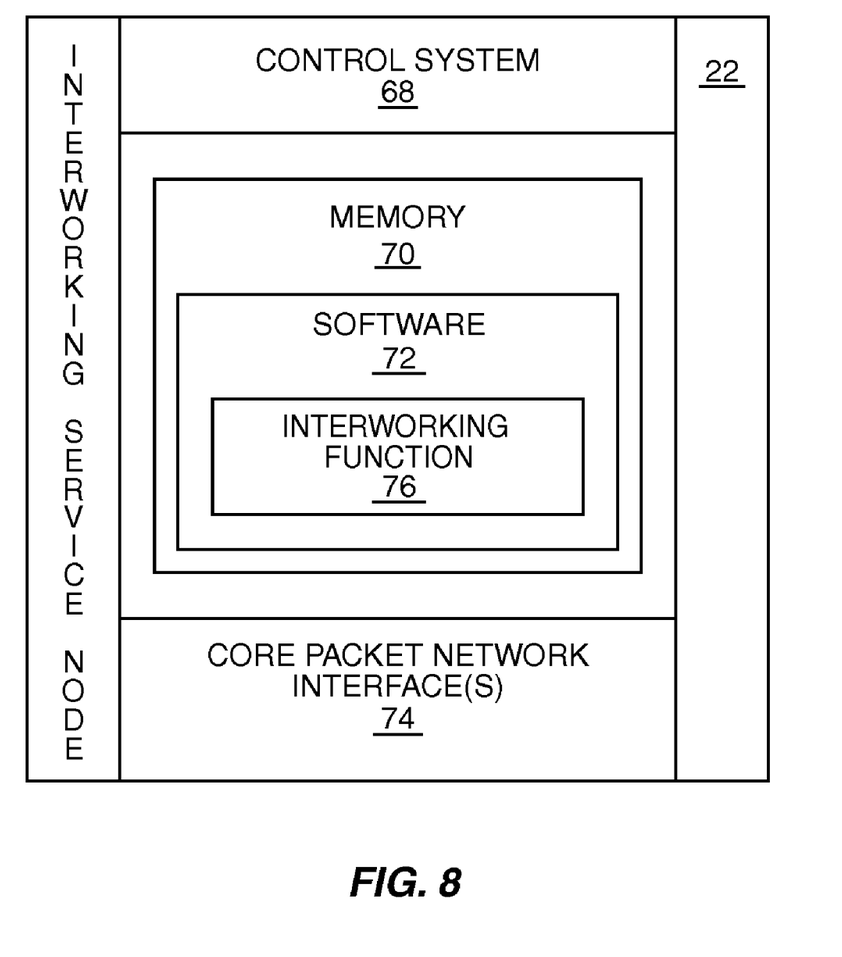
FIG. 8 is a block representation of an interworking service node according to one embodiment of the present invention.

Turning now to FIG. 8, a block diagram of an ISN 22 is illustrated. The ISN 22 will include a control system 68 having sufficient memory 70 to store the software 72 necessary for operation as described above. The control system 68 is also associated with one or more packet network interfaces 74 to facilitate communications over the packet network 12. As noted above, the ISN 22 is capable of mapping ISUP FAC message or like messages from an ES switch 20 to initiate reestablishment of a held ES call to Invite messages instead of information messages.

Those skilled in the art will recognize improvements and modifications to the preferred embodiments of the present invention. All such improvements and modifications are considered within the scope of the concepts disclosed herein and the claims that follow.

What is claimed is:

1. A method for facilitating a forced hold function for a call established across a voice over packet network and a public switched telephone network comprising:
   receiving from the voice over packet network a disconnect message indicative of an attempt to disconnect a call established between a communication client and a remote endpoint;
   sending over the public switched telephone network a forced hold message to place the call on forced hold in response to receiving the disconnect message, wherein a portion of the call extending toward the remote endpoint and through the public switched telephone network is placed on hold and a portion of the call extending toward the communication client through the voice over packet network is dropped;
   receiving over the public switched telephone network a reconnect request message to reestablish the call with the communication client;
   generating a session initiation message in response to receiving the reconnect request message; and
   sending the session initiation message toward the communication client, the session initiation message configured to reestablish the call with the communication client.

2. The method of claim 1 wherein the call is established across the voice over packet network using a packet session and across the public switched telephone network using a circuit-switched connection, wherein the portion of the call extending toward the communication client that is dropped is the packet session; and the call is reestablished by reestablishing the packet session.

3. The method of claim 1 wherein the call is an emergency services call and the remote endpoint is an emergency services endpoint.

4. The method of claim 3 wherein the session initiation message comprises information identifying the emergency services call.

5. The method of claim 3 wherein the session initiation message comprises information providing a priority for the emergency services call.

6. The method of claim 3 wherein sending the forced hold message results in placing the call on hold at an emergency services access point and receiving the reconnect request message is a result of a reconnect request provided by the emergency services access point.

7. The method of claim 1 further comprising sending an acknowledgement message toward the communication client in response to the disconnect message to indicate that the call is disconnected.

8. The method of claim 1 wherein the forced hold message and the reconnect request message are integrated services user part messages.

9. The method of claim 8 wherein the integrated services user part messages are facilities messages, the forced hold message comprises a feature code indicator corresponding to a forced hold request, and the reconnect request message comprises a feature code indicator corresponding to a reconnect request.

10. The method of claim 1 wherein the disconnect message and the session initiation message are voice over packet protocol messages.

11. The method of claim 10 wherein the voice over packet protocol messages are session initiation protocol messages.

12. A service node for facilitating a forced hold function for a call established across a voice over packet network and a public switched telephone network comprising:
   at least one communication interface; and
   a control system associated with the at least one communication interface and adapted to:
      receive from the voice over packet network a disconnect message indicative of an attempt to disconnect a call established between a communication client and a remote endpoint;
      send over the public switched telephone network a forced hold message to place the call on forced hold in response to receiving the disconnect message, wherein a portion of the call extending toward the remote endpoint and through the public switched telephone network is placed on hold and a portion of the call extending toward the communication client through the voice over packet network is dropped;
      receive over the public switched telephone network a reconnect request message to reestablish the call with the communication client;
      generate a session initiation message in response to receiving the reconnect request message; and
      send the session initiation message toward the communication client, the session initiation message configured to reestablish the call with the communication client.

13. The service node of claim 12 wherein the call is established across the voice over packet network using a packet session and across the public switched telephone network using a circuit switched connection, wherein the portion of the call extending toward the communication client that is dropped is the packet session; and the call is reestablished by reestablishing the packet session.

14. The service node of claim 12 wherein the call is an emergency services call and the remote endpoint is an emergency services endpoint.

15. The service node of claim 14 wherein the session initiation message comprises information identifying the emergency services call.

16. The service node of claim 14 wherein the session initiation message comprises information providing a priority for the emergency services call.

17. The service node of claim 14 wherein sending the forced hold message results in placing the call on hold at an emergency services access point and receiving the reconnect request message is a result of a reconnect request provided by the emergency services access point.

18. The service node of claim 12 wherein the control system is further adapted to send an acknowledgement message toward the communication client in response to the disconnect message to indicate that the call is disconnected.

19. The service node of claim 12 wherein the forced hold message and the reconnect request message are integrated services user part messages.

20. The service node of claim 19 wherein the integrated services user part messages are facilities messages, the forced hold message comprises a feature code indicator corresponding to a forced hold request, and the reconnect request message comprises a feature code indicator corresponding to a reconnect request.

21. The service node of claim 12 wherein the disconnect message and the session initiation message are voice over packet protocol messages.

22. The service node of claim 21 wherein the voice over packet protocol messages are session initiation protocol message.

* * * * *